(12) United States Patent
Maloney et al.

(10) Patent No.: US 6,824,222 B2
(45) Date of Patent: Nov. 30, 2004

(54) SEAT BELT SYSTEM WITH DUAL PAYOUT RETRACTOR

(75) Inventors: Barry J. Maloney, Clinton Township, MI (US); Joseph J. Zwolinski, Warren, MI (US); Arnold J. Herberg, Davisburg, MI (US); Alex P. Kotivosky, West Bloomfield, MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 1 day.

(21) Appl. No.: 10/212,998

(22) Filed: Aug. 6, 2002

(65) Prior Publication Data

US 2004/0026981 A1 Feb. 12, 2004

(51) Int. Cl.⁷ .............................................. B60R 21/00
(52) U.S. Cl. ........................ 297/478; 297/479; 297/480
(58) Field of Search .............................. 297/468, 478, 297/479, 480

(56) References Cited

U.S. PATENT DOCUMENTS

| | | | |
|---|---|---|---|
| 3,165,357 A | 1/1965 | Ruedemann, Jr. | |
| 3,287,062 A | * 11/1966 | Board et al. | 297/479 |
| 3,639,000 A | 2/1972 | Keltner | |
| 3,847,434 A | * 11/1974 | Weman | 297/478 |
| 4,120,466 A | * 10/1978 | Adomeit | 242/381.4 |
| 4,323,204 A | * 4/1982 | Takada | 242/381.4 |
| 4,342,483 A | 8/1982 | Takada | |
| 4,485,985 A | 12/1984 | Fohl | |
| 4,550,951 A | * 11/1985 | Apri | 297/480 |
| 4,919,488 A | 4/1990 | Deegener et al. | |
| 5,029,896 A | * 7/1991 | Ernst | 280/806 |
| 5,660,346 A | 8/1997 | Dick | |
| 5,676,398 A | 10/1997 | Nurtsch | |
| 6,076,894 A | 6/2000 | Busch | |
| 6,309,024 B1 | 10/2001 | Busch | |

FOREIGN PATENT DOCUMENTS

| | | |
|---|---|---|
| AU | 214350 | 1/1957 |
| DE | 7626542 | 12/1977 |
| DE | 3636203 A1 | 5/1988 |
| DE | 3838789 A1 | 5/1990 |
| DE | 19505448 A1 | 8/1996 |
| EP | 0383473 A2 | 8/1990 |

* cited by examiner

Primary Examiner—Peter M. Cuomo
Assistant Examiner—Joseph Edell
(74) Attorney, Agent, or Firm—Tarolli, Sundheim, Covell & Tummino L.L.P.

(57) ABSTRACT

A seat belt system (10) includes a lap belt (60) including a first portion (74) and a second portion (85). A retractor (76) includes a spool (96) rotatable about an axis (160). The first and second lap belt portions (74, 85) are secured to the spool (96). The spool (96) is biased to rotate in a first rotational direction to wind the first and second portions (74, 85) onto the spool. The first and second portions (74, 85) when tensioned urge the spool (96) to rotate in a second rotational direction opposite said first rotational direction to unwind the first and second portions from the spool. A locking mechanism (170) is actuatable to lock the spool (96) against rotation in the second rotational direction. First and second web grabbing devices (180, 182) are actuatable to clamp onto the first and second portions (74, 85) when the locking mechanism (170) is in the locked condition.

20 Claims, 9 Drawing Sheets

SEAT BELT SYSTEM WITH DUAL PAYOUT RETRACTOR

FIELD OF THE INVENTION

The present invention relates to a seat belt system for restraining a vehicle occupant in a vehicle seat.

BACKGROUND OF THE INVENTION

A known seat belt system for an occupant positioned in a seat of the vehicle includes a pair of shoulder belts extending from an upper portion of the vehicle seat. Each of the shoulder belts has one end connected with the vehicle and another end connected with a buckle assembly.

A lap belt extends from each side of the vehicle seat and partially across the lap the vehicle occupant. Each of the lap belts has one end anchored to the vehicle adjacent a side of the vehicle seat. Each of the lap belts has another end connected with the buckle assembly. The buckle assembly interconnects the shoulder belts with the lap belts when the belts are extended about the occupant of the seat.

SUMMARY OF THE INVENTION

In accordance with the present invention, a seat belt system for helping to restrain an occupant of a vehicle seat includes a lap belt. The lap belt includes first and second portions extensible adjacent opposite sides of the vehicle seat and across a seating portion of the seat. A buckle assembly releasably connects the first and second portions of the lap belt while extended across the seat. A retractor includes a spool rotatable about an axis. The first and second portions are secured to the spool. The spool is biased to rotate in a first rotational direction to wind the first and second portions onto the spool. The first and second portions when tensioned urge the spool to rotate in a second rotational direction opposite said first rotational direction to unwind the first and second portions from the spool. A locking mechanism is actuatable to lock the spool against rotation in the second rotational direction. A first web grabbing device is actuatable to clamp onto the first portion when the locking mechanism is in the locked condition. A second web grabbing device is actuatable to clamp onto the second portion when the locking mechanism is in the locked condition.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF AN EMBODIMENT

Figure 1:
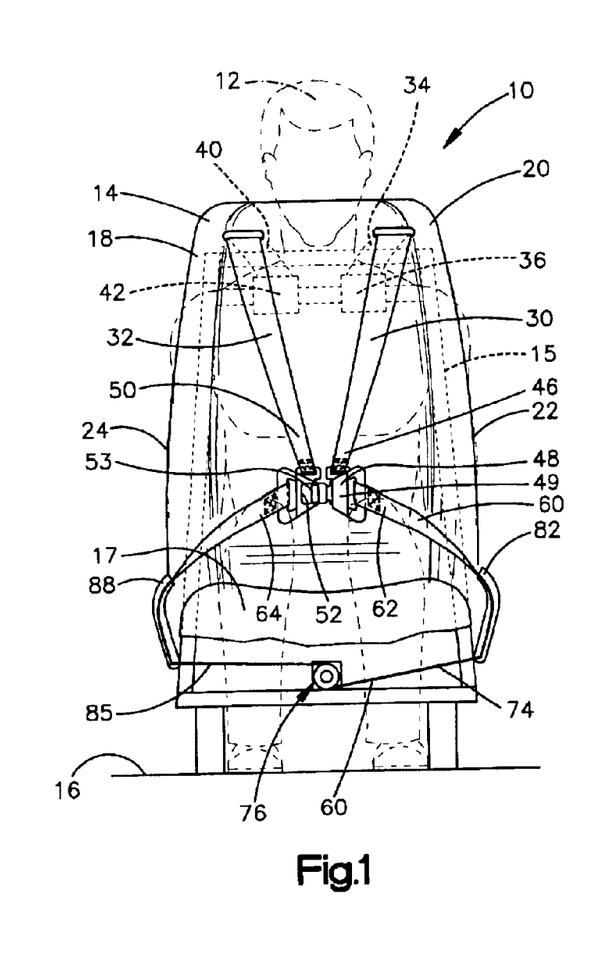
FIG. 1 is a schematic view of a vehicle seat including a seat belt system of the present invention.
Figure 2:
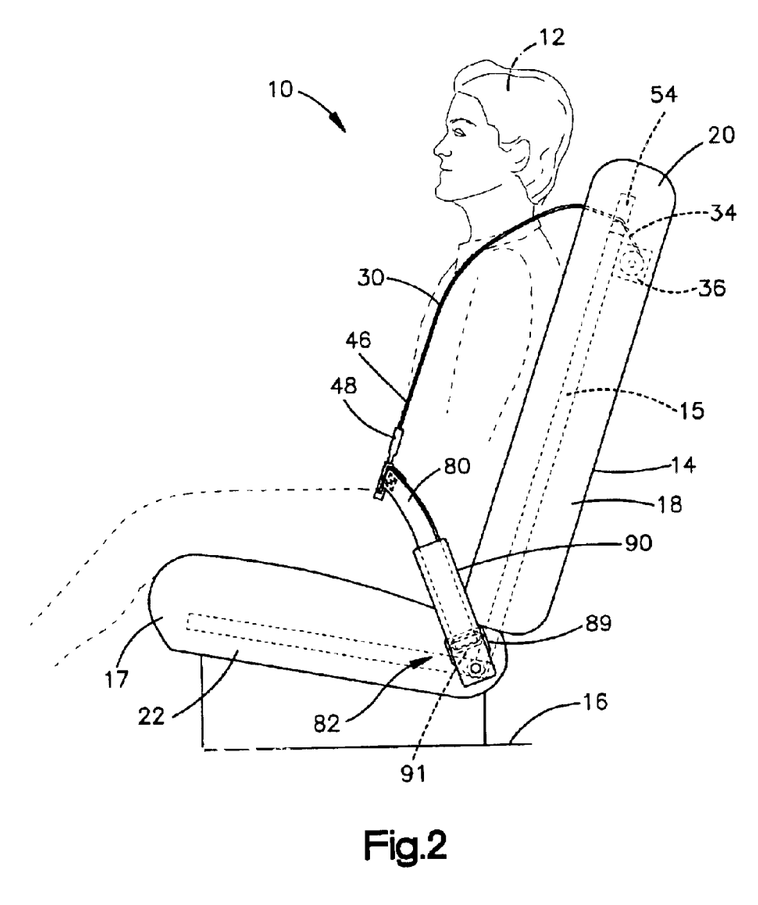
FIG. 2 is a schematic side view of the vehicle seat of FIG. 1.

A seat belt system 10 for restraining a vehicle occupant 12 seated in a vehicle seat 14 is shown in FIGS. 1 and 2. The seat 14 has a frame 15 connected with a floor 16 of a vehicle in a manner known in the art. The seat 14 has a seat portion 17 on which the occupant 12 sits. A backrest 18 extends from the seat portion 17. The backrest 18 has an upper portion 20 located adjacent the shoulders of the occupant 12. The seat 14 has sides 22 and 24 located adjacent sides of the occupant 12.

Shoulder belts 30 and 32 (FIG. 1) extend from the upper portion 20 of the backrest 18 adjacent the shoulders of the occupant 12. The shoulder belt 30 (FIGS. 1 and 2) has an end 34 connected with a shoulder belt retractor 36. The shoulder belt 32 has an end 40 connected with a shoulder belt retractor 42. In the embodiment illustrated in FIGS. 1 and 2, the retractors 36 and 42 are mounted on the frame 15 of the backrest 18 adjacent the shoulders of the occupant 12. It will be appreciated, however, that the retractors 36 and 42 could be mounted in alternative locations, such as lower on the frame 15 or on the vehicle floor 16.

The shoulder belt retractors 36 and 42 include springs (not shown) for biasing the retractors to wind the shoulder belts 30 and 32 onto the retractors. The retractors 36 and 42 include locking mechanisms (not shown) actuatable to help prevent unwinding of the shoulder belts 30 and 32 upon the occurrence of an event for which occupant protection is desired. The retractors 36 and 42 preferably lock in response to a sensor (not shown) sensing deceleration of the vehicle above the predetermined value and/or in response to unwinding acceleration of the shoulder belts 30 and 32, respectively, above a predetermined value.

The shoulder belt 30 (FIG. 1) has another end 46 connected with a buckle member 48 of a buckle assembly 49. The buckle assembly 49 may have any configuration suitable for use with the seat belt arrangement of FIGS. 1 and 2. The shoulder belt 32 has another end 50 connected with a buckle member 52 of the buckle assembly 49. A guide 54 (FIG. 2) guides the shoulder belt 30 from the retractor 36 to the buckle member 48. Another guide (not shown) guides the shoulder belt 32 from the retractor 42 to the buckle member 52. The guides are fixedly connected to the seat frame 15 in the backrest 18.

The shoulder belt 30 is connected to the buckle member 48 by known means, such as extending the belt through a slot in the buckle member and sewing the belt onto itself to form a loop connecting the belt to the buckle member. The shoulder belt 32 is connected to the buckle member 52 by known means, such as extending the belt through a slot in the buckle member and sewing the belt onto itself to form a loop connecting the belt to the buckle member. Alternatively, the shoulder belts 30 and 32 could be connected to respective lockable members, such as tongues, which are releasably latched to the buckle members 48 and 52, respectively.

The buckle member 48 (FIG. 1) has a tongue (not shown) which is engageable with a locking member (not shown) of the buckle member 52 to interconnect the buckle members 48 and 52 in a manner known in the art. Also, the buckle member 52 has a pushbutton 53, which when pushed disconnects the buckle members 48 and 52.

A lap belt 60 (FIGS. 1 and 2) has opposite first and second ends 62 and 64. The first end 62 is connected to the buckle member 48 by known means, such as extending the belt through a slot in the buckle member and sewing the belt onto itself to form a loop connecting the belt to the buckle member. The second end 64 is connected to the buckle member 52 by known means, such as extending the belt through a slot in the buckle member and sewing the belt onto itself to form a loop connecting the belt to the buckle member. Alternatively, the ends 62 and 64 could be connected to respective lockable members, such tongues, which are releasably latched to the respective buckle members 48 and 52.

A first portion 74 of the lap belt 60 extends from the first end 62 to a seat belt retractor 76. The retractor 76 is connected to the frame 15 below the seat portion 17. When the buckle members 48 and 52 are interconnected, the first portion 74 extends from the seat belt retractor 76 through a guide 82 to the buckle member 48. The guide 82 guides the first portion 74 from the retractor 76 around the seat portion 17 and across the lap of the occupant to the buckle member 48.

A second portion 85 of the lap belt 60 extends from the second end 64 to the seat belt retractor 76. When the buckle members 48 and 52 are interconnected, the second portion 85 extends from the seat belt retractor 76 through a guide 88 to the buckle member 52. The guide 88 guides the second portion 85 from the retractor 76 around the seat portion 17 and across the lap of the occupant to the buckle member 52.

Referring to FIG. 2, the guide 82 includes a guide element 89 and a cover 90 surrounding the guide element. The cover 90 could, however, be omitted. The guide 82, i.e., the guide element 89 and the cover 90, is pivotally attached to the seat frame 15. The guide element 89 includes a slot 91 through which the first portion 74 of the lap belt 60 extends. The hollow cover 90 encloses the guide element 89 and extends away from the guide element 89 toward the buckle member 48. The cover 90 is contoured to curve around a part of the occupant 12 as it extends toward the buckle member 48.

The guide 88 is similar to the guide 82 and will not be described in detail. The guide 88 (FIG. 1) is pivotally connected with the frame 15 of the seat 14 adjacent the side 24. The guide 88 includes a guide element similar to the guide element 89 of the guide 82. A hollow cover, similar to the cover 90, is connected with the guide element and extends toward the buckle member 52. The cover is contoured to curve around the occupant 12.

Those skilled in the art will appreciate that the guides 82 and 88 could have alternative constructions suitable for guiding the first and second portions 74 and 85 of the lap belt 60 from the retractor 76 to the respective buckle portions 48 and 52. For example, the guides 82 and 88 could include D-rings, rollers, or any other suitable devices for guiding the first and second portions 74 and 85 of the lap belt 60.

Figure 3:
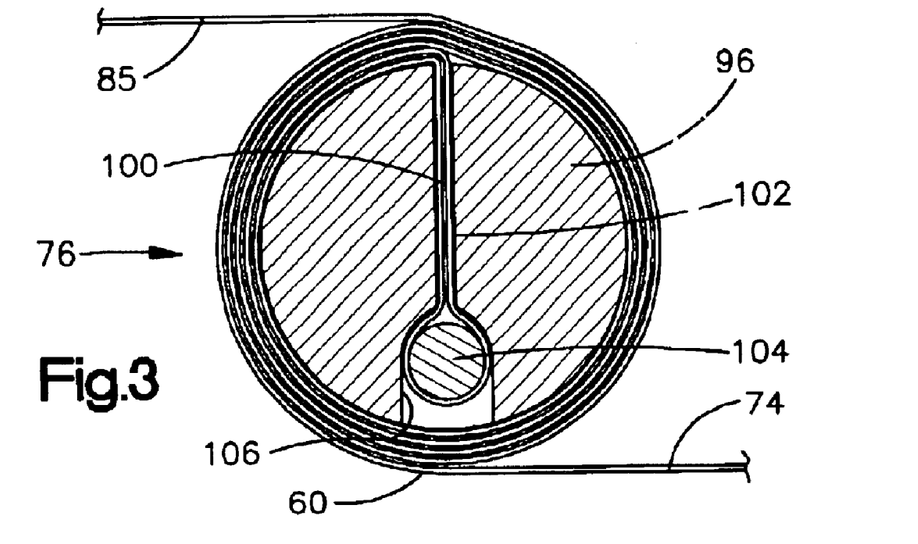
FIG. 3 is an enlarged schematic view of a portion of the seat belt system of FIGS. 1 and 2.

The retractor 76 of the present invention is a dual payout retractor. As known in the art, the dual payout retractor 76 includes a single spool 96 around which both the first and second portions 74 and 85 of the lap belt 60 are wound. The first and second portions 74 and 85 are thus wound onto or unwound from the spool 96 simultaneously. Referring to FIG. 3, the first and second portions 74 and 85 comprise portions of a single length of belt webbing material. The first and second portions 74 and 85 could, however, be constructed of separate lengths of webbing material.

The first and second portions 74 and 85 of the lap belt 60 are wound on the spool 96 in an overlapping manner. A central portion 100 of the lap belt 60, where the first and second portions 74 and 85 meet, is folded over onto itself to form a loop that is inserted in a slot 102 of the spool 96. The central portion 100 is retained in the slot 102 by a pin 104 located in a recess 106 in the spool 96. The pin 104 extends through the loop formed by the central portion 100 to secure the lap belt 60 to the spool 96. In this configuration, the first and second portions 74 and 85 of the lap belt 60 have respective end portions, opposite the ends 62 and 64, secured to the spool 96.

Figure 4:
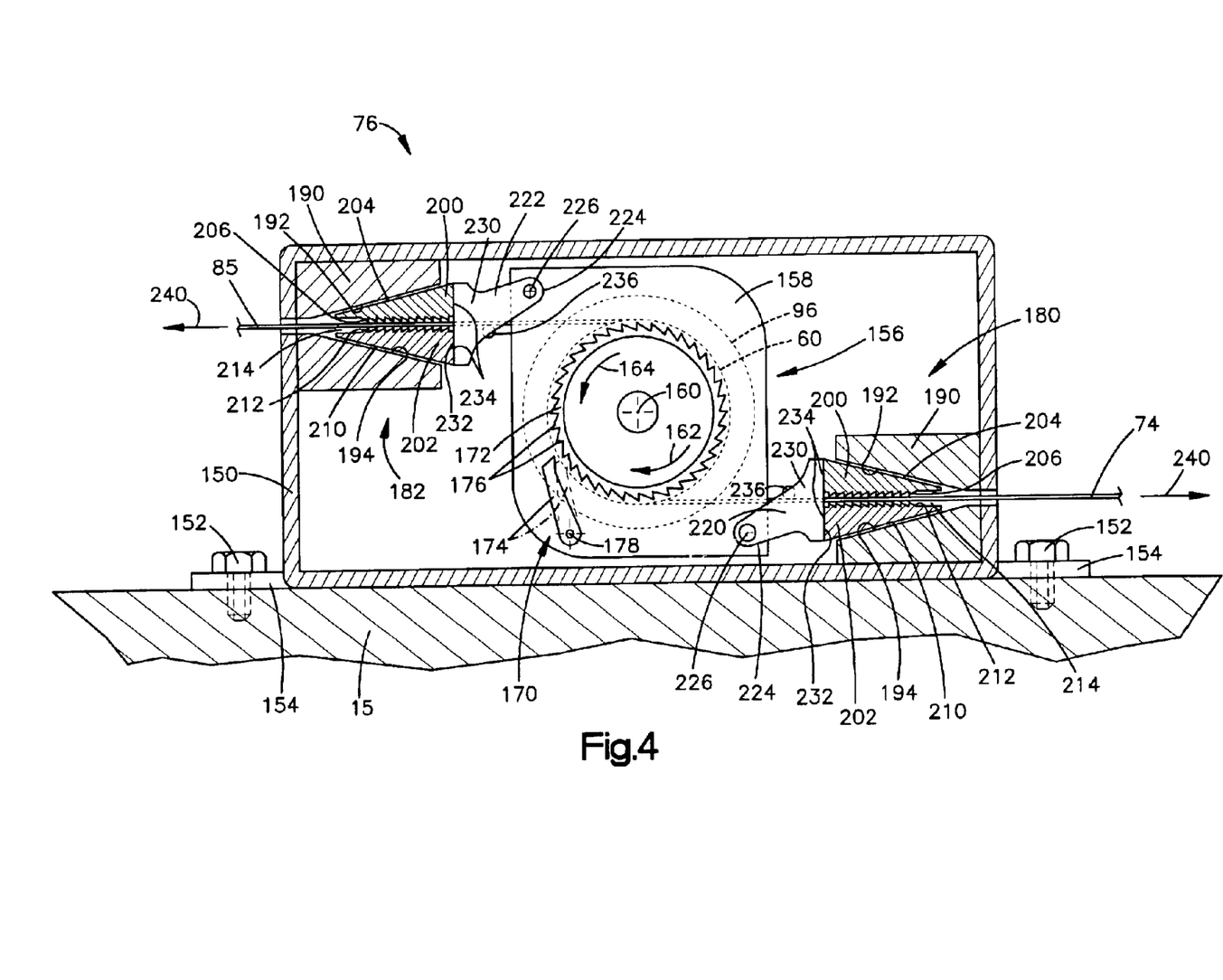
FIG. 4 is a schematic view, partially in section, of a portion of the seat belt system of FIGS. 1 and 2 in a first condition, according to a first embodiment of the present invention.
Figure 5:
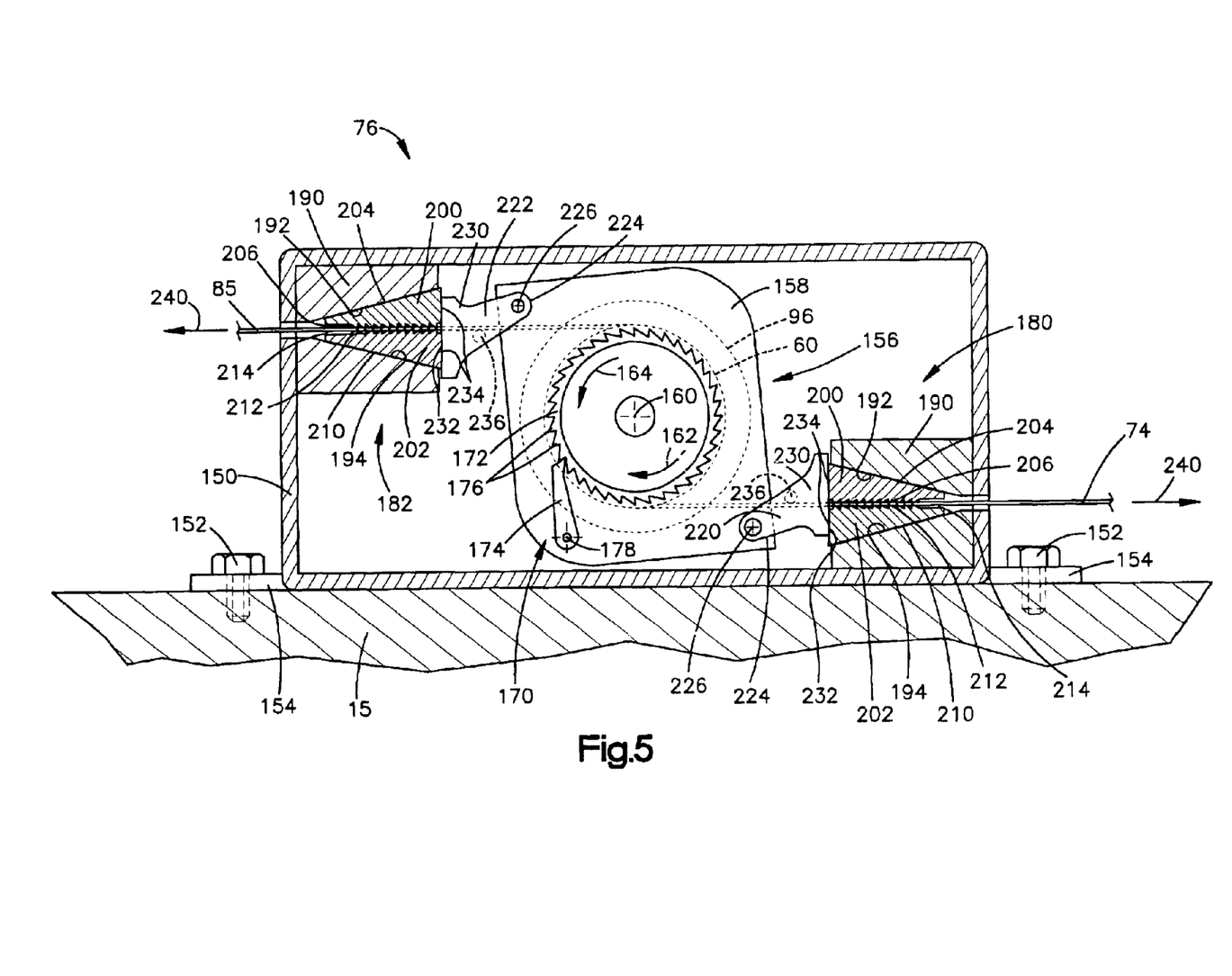
FIG. 5 is a schematic view, partially in section, of the portion of the seat belt system of FIG. 4 in a second condition.

The retractor 76 has a spring (not shown) for biasing the spool 96 to wind the lap belt portions 74 and 85 onto the spool in a manner known in the art. In the embodiment of FIGS. 4 and 5, the spring of the retractor 76 has a spring bias that is stronger than the combined spring bias of the shoulder belt retractors 36 and 42.

When the buckle members 48 and 52 (FIGS. 1 and 2) are disconnected, the retractors 36, 42, and 76 retract the shoulder belts 30 and 32 and the lap belt portions 74 and 85. The retractor 76 applies equal forces to the lap belt portions 74 and 85. The lap belt portion 74 slides in the guide 82 and is wound on the retractor spool 96. Likewise, the lap belt portion 85 slides in the guide 88 and is wound on the retractor spool 96. The buckle members 48 and 52 are pulled by the belt portions 74 and 85 in opposite directions toward the respective sides 22 and 24 of the seat 14. The buckle members 48 and 52 are pulled into contact with the guides 82 and 88, respectively.

When the occupant 12 interconnects the buckle members 48 and 52, the shoulder belt portions 30 and 32 and the lap belt portions 74 and 85 are withdrawn from their respective retractors 36, 42, and 76. When the buckle members 48 and 52 are interconnected, by the occupant 12, the retractor 76 biases the lap belt portions 74 and 85 to wind onto the spool 96. This helps center the buckle assembly 49 relative to the occupant 12.

The retractor 76 acting on the lap belt portions 74 and 85 pulls the buckle members 48 and 52 rearwardly and downwardly relative to the vehicle occupant 12 to help locate the buckle members adjacent the waist of the occupant. The bias of the spring in the retractor 76 preferably is strong enough to overcome the combined force of the bias of the springs in the retractors 36 and 42, friction in the system, and the weight of the belt portions and buckle members 48 and 52 to move the buckle members rearwardly and downwardly relative to the vehicle occupant.

A dual payout retractor 76 constructed in accordance with a first embodiment of the present invention is illustrated in FIGS. 4 and 5. The retractor 76 includes a housing 150 fixed to the seat frame 15 by means 152, such as fasteners, extending through flanges 154 of the housing. The retractor 76 includes a retractor assembly 156 supported in the housing 150. The retractor assembly 156 includes a actuator plate 158. The spool 96 is mounted to the actuator plate 158 and is rotatable about an axis 160. The spool 96 is rotatable in a clockwise direction as viewed in FIGS. 4 and 5 and indicated by the arrow labeled 162 to retract (wind) the first and second portions 74 and 85 of the lap belt 60. The spool 96 is rotatable in a counterclockwise direction as viewed in FIGS. 4 and 5 and indicated by the arrow labeled 164 to pay out (unwind) the first and second portions 74 and 85 of the lap belt 60.

The spool 96 is biased in a known manner by a spring or other suitable biasing means (not shown) to rotate in the clockwise direction 162 to retract the lap belt 60. The spool 96 is biased against the actuator plate 158 to rotate in the clockwise direction 162. The actuator plate 158 is pivotal relative to the housing 150 about the axis 160. The actuator plate 158 is biased in the clockwise direction 162 into the position of FIG. 4 by a spring or other suitable biasing means (not shown). The spring bias acting on the actuator plate 158 is stronger than the spring bias acting on the spool 96.

The retractor assembly 156 also includes a mechanism for locking the spool 96 against rotation to prevent payout (unwinding) of the first and second portions 74 and 85 of the lap belt 60 in the event of the vehicle encountering deceleration above a predetermined value. The present invention may incorporate the use of any means known in the art for locking the spool against rotation relative to the actuator plate 158. In the embodiment of FIGS. 4 and 5, the retractor assembly 156 includes a locking mechanism 170 comprising a ratchet 172, connected to the spool 96 and rotatable with the spool about the axis 160, and a pawl 174, connected to the actuator plate 158. The pawl 174 is pivotal about an axis 178 to engage teeth 176 of the ratchet to block rotational movement of the ratchet and thus the spool 96. The locking mechanism 170 blocks rotation of the spool to help prevent payout (unwinding) of the first and second portions 74 and 85 of the lap belt 60.

The locking mechanism 170 preferably locks the spool 96 in response to a deceleration of the vehicle above a predetermined value and/or in response to unwinding acceleration of the lap belt portions 74 and 85 above a predetermined value. The locking mechanism 170 may be actuated (i.e., the pawl 174 may be actuated to engage the teeth 176) by any suitable means known in the art. For example, the locking mechanism 170 may be actuated via a mechanical inertia or deceleration switch. Alternatively, the locking means 170 could include means for sensing deceleration and/or unwinding of the lap belt 60 and providing a signal for actuating the pawl 174 via an electromechanical or electromagnetic actuator.

Those skilled in the art will appreciate that, during events of high vehicle deceleration (e.g., a vehicle collision), the loads placed on the retractor 76 may be relatively high. In this instance, the pawl 174 and the ratchet 172 must withstand the high loads placed on the retractor 76 to prevent payout of the first and second portions 74 and 85 of the lap belt 60. According to the present invention, the retractor 76 includes means separate from the retractor assembly 156 for helping to block payout of the first and second portions 74 and 85 of the lap belt 60.

Referring to FIGS. 4 and 5, the retractor 76 includes first and second web grabbing devices 180 and 182, referred to herein as "web grabbers", that are actuatable to help block payout of the first and second portions 74 and 85 of the lap belt 60, respectively. In the embodiment illustrated in FIGS. 4 and 5, the first and second web grabbers 180 and 182 comprise wedge clamps. Each of the web grabbers 180 and 182 includes a housing 190 having a planar first sliding surface 192 presented towards a planar second sliding surface 194. The first and second sliding surfaces 192 and 194 are presented at an angle towards each other.

A pair of clamp members 200 and 202 are supported between the sliding surfaces 192 and 194 for sliding movement along the surfaces relative to the housing 190. The first clamp member 200 has a generally triangular wedge-shaped cross-sectional configuration with a planar sliding surface 204 in abutting engagement with the first sliding surface 192 of the housing 190. The first clamp member 200 has a planar clamping surface 206 that may include a plurality of teeth. The clamping surface 206 is angled relative to the sliding surface 204.

The second clamp member 202 has a generally triangular, wedge-shaped cross-sectional configuration with a planar sliding surface 210 in abutting engagement with the second sliding surface 194 of the housing 190. The second clamp member 202 has a planar clamping surface 212 that may include a plurality of teeth. The clamping surface 212 is angled relative to the sliding surface 210.

The clamping surfaces 206 and 212 of the first and second clamp members 200 and 202 define between them a belt webbing passage 214 through which the belt webbing of the lap belt 60 is movable to pay out and retract the lap belt. The first portion 74 of the lap belt 60 is extensible through the belt webbing passage 214 of the first web grabber 180. The second portion 85 of the lap belt 60 is extensible through the belt webbing passage 214 of the second web grabber 182.

The clamp members 200 and 202 of the web grabbers 180 and 182 are adapted for simultaneous sliding movement relative to the housing 190. The clamping surfaces 206 and 212 are thus adapted to move simultaneously toward or away from each other as they slide relative to the housing 190. A biasing member (not shown) such as a spring biases the clamp members 200 and 202 to slide relative to the housing 190 such that the clamping surfaces 206 and 212 move away from each other into an unactuated condition of FIG. 4. In the unactuated condition, the first and second portions 74 and 85 of the lap belt 60 are released by the web grabbers 180 and 182, respectively. Thus, in the unactuated condition, the first and second portions 74 and 85 may be paid out from and retracted into the retractor 76.

The retractor 76 includes first and second actuator arms 220 and 222 for actuating the first and second web grabbers 180 and 182, respectively. Each of the actuator arms 220 and 222 includes a first end portion 224 connected to the actuator plate 158 of the retractor assembly 156 and pivotal about an axis 226. The actuator arms 220 and 222 include a second end portion 230 opposite the first end portion 224 that includes a surface 232 maintained in abutting engagement with respective end surfaces 234 of the first and second clamp members 200 and 202.

The retractor 76 also includes webbing guides 236 for helping to guide the first and second portions 74 and 85 of the lap belt 60 through the retractor. The webbing guides 236 may comprise any suitable means, such as a pin, roller, etc. The webbing guides 236 help maintain the first and second portions 74 and 85 aligned with their respective belt webbing passages 214 as the lap belt 60 winds and unwinds from the spool 96.

Upon the occurrence of an event for which it is desirable for the retractor 76 to block payout of the lap belt 60, the locking mechanism 170 is actuated (i.e., the pawl 174 is actuated to engage the teeth 176). This, in turn, actuates the retractor from the unlocked condition of FIG. 4 to the locked condition of FIG. 5. When the pawl 174 moves into engagement with the teeth 176 of the ratchet 172 (as indicated by the pawl illustrated in dot-dashed lines in FIG. 4), rotation of the spool 96 in the counterclockwise (payout) direction 164 is blocked. Tension on the first and second portions 74 and 85 of the lap belt 60, indicated generally by the arrows labeled 240, is thus imparted to the actuator plate 158 of the retractor assembly 156. This tension causes the actuator plate 158 to pivot about the axis 160 in the counterclockwise direction 164 from the unactuated (unlocked) condition of FIG. 4 to the actuated (locked) condition of FIG. 5.

As the actuator plate 158 pivots to the actuated condition, the actuator arms 220 and 222 impart a force to the clamping members 200 and 202 of the first and second web grabbers 180 and 182, respectively. This force urges the clamping members 200 and 202 to slide relative to the housing 190 in a direction that causes the clamping surfaces 206 and 212 to move toward each other and clamp down on the webbing of the lap belt 60. The clamping surfaces 206 and 212 thus "grab" the webbing of the lap belt 60 and help prevent payout of the lap belt from the retractor 76. The teeth, if included on the clamping surfaces 206 and 212, may help increase the grabbing effect of the clamping members 200 and 202. The first web grabber 180 grabs and helps prevent payout of the first portion 74 of the lap belt 60. The second web grabber 182 grabs and helps prevent payout of the second portion 85 of the lap belt 60.

Once the clamping surfaces 206 and 212 grab the first and second portions 74 and 85 of the lap belt 60, increased tension on the portions urges the clamping members 200 and 202 to slide further relative to the housing 190. This increases the force by which the clamping surfaces 206 and 212 are urged together onto the first and second portions. The web grabbers 180 and 182 may thus bear a large portion of the force placed on the retractor 76 by the tensioned first and second portions 74 and 85 of the lap belt 60 when the retractor is in the actuated condition of FIG. 5.

Figure 6:
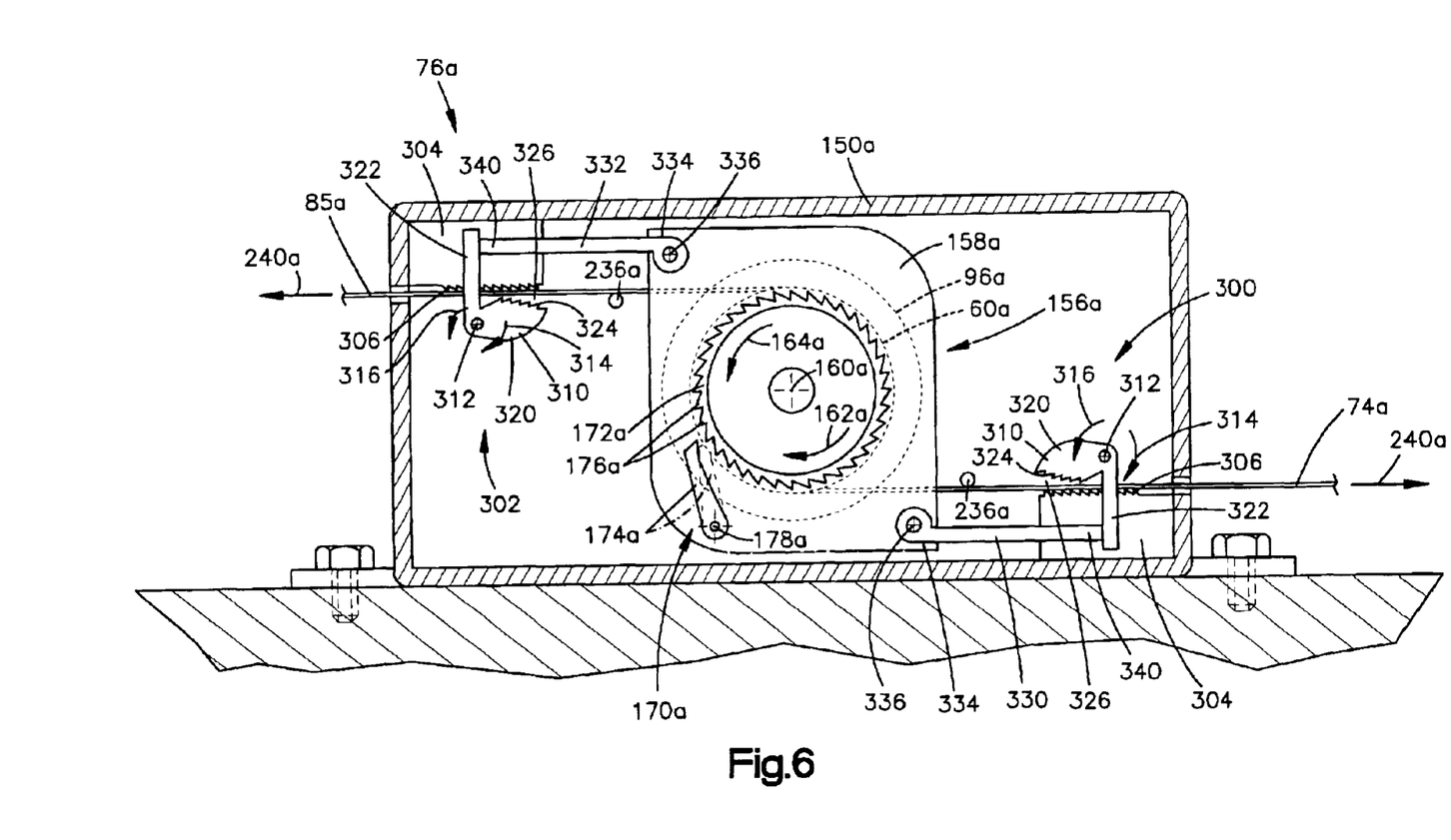
FIG. 6 is a schematic view, partially in section, of a portion of the seat belt system of FIGS. 1 and 2 in a first condition, according to a second embodiment of the present invention.
Figure 7:
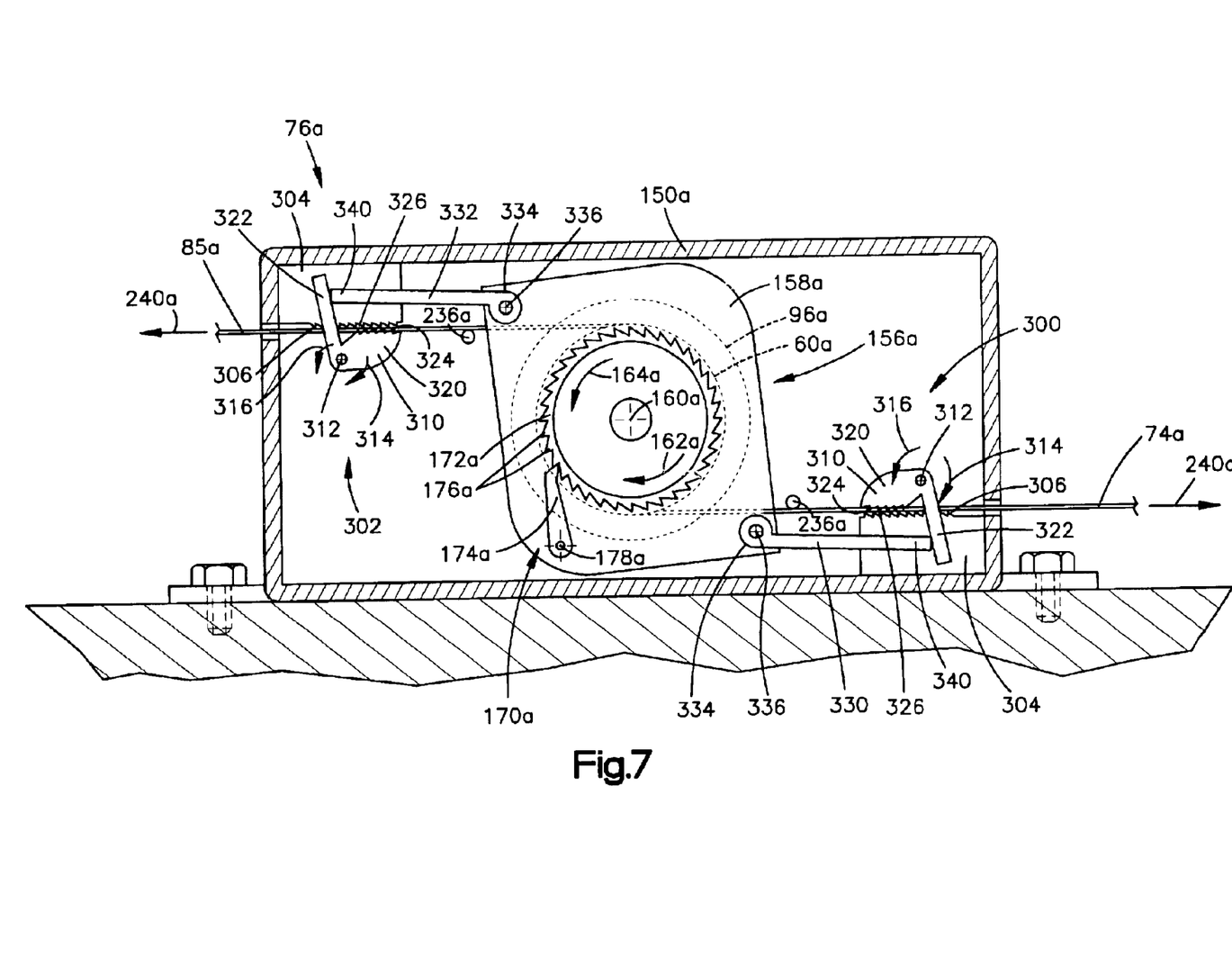
FIG. 7 is a schematic view, partially in section, of the portion of the seat belt system of FIG. 6 in a second condition.

A second embodiment of the present invention is illustrated in FIGS. 6 and 7. The second embodiment of the invention is similar to the first embodiment of the invention illustrated in FIGS. 4 and 5. Accordingly, numerals similar to those of FIGS. 4 and 5 will be used in FIGS. 6 and 7 to identify similar components, the suffix letter "a" being associated with the numerals of FIGS. 6 and 7 to avoid confusion. As illustrated in FIGS. 6 and 7, the dual payout retractor 76a includes first and second web grabbers 300 and 302 and respective first and second actuator arms 330 and 332 having a different construction than the web grabbers 180 and 182 (FIGS. 4 and 5) and actuator arms 220 and 222 of the first embodiment.

The retractor assembly 156a has a construction similar or identical to the retractor assembly 156 (FIGS. 4 and 5) of the first embodiment. The retractor assembly 156a (FIGS. 6 and 7) is supported in the housing 150a and includes a actuator plate 158a to which the spool 96a is mounted. The spool 96a is rotatable about the axis 160a relative to the actuator plate 158a. The actuator plate 158a is pivotable about the axis 160a. The spool 96a is rotatable in the clockwise direction 162a to retract (wind) the first and second portions 74a and 85a of the lap belt 60a. The spool 96a is rotatable in the counterclockwise direction 164a to pay out (unwind) the first and second portions 74a and 85a of the lap belt 60a. The retractor 76a includes webbing guides 236a for helping to guide the first and second portions 74a and 85a of the lap belt 60a through the retractor.

The spool 96a is biased in a known manner by a spring or other suitable biasing means (not shown) to rotate in the clockwise direction 162a to retract the lap belt 60a. The spool 96a is biased against the actuator plate 158a to rotate in the clockwise direction 162a. The actuator plate 158a is pivotal relative to the housing 150a about the axis 160a. The actuator plate 158a is biased in the clockwise direction 162a into the position of FIG. 6 by a spring or other suitable biasing means (not shown). The spring bias acting on the actuator plate 158a is stronger than the spring bias acting on the spool 96a.

The retractor assembly 156a also includes a locking mechanism 170a comprising a ratchet 172a, connected to the spool 96a and rotatable with the spool about the axis 160a, and a pawl 174a, connected to the actuator plate 158a. The pawl 174a is pivotal about an axis 178a to engage teeth 176a of the ratchet 172a to block rotational movement of the ratchet and thus the spool 96a. The locking mechanism 170a blocks rotation of the spool 96a to help prevent payout (unwinding) of the first and second portions 74a and 85a of the lap belt 60a. The locking mechanism 170a is actuatable by any suitable means to lock the spool 96a in response to a deceleration of the vehicle above a predetermined value and/or in response to unwinding acceleration of the lap belt portions 74a and 85a above a predetermined value.

The first and second web grabbers 300 and 302 are actuatable to help block payout of the first and second portions 74a and 85a of the lap belt 60a, respectively. In the embodiment illustrated in FIGS. 6 and 7, the first and second web grabbers 300 and 302 comprise rotary clamps. Each of the web grabbers 300 and 302 includes a base 304 and a clamp member 310, both of which are supported in the housing 150a. The base 304 includes a clamping surface 306 including a plurality of teeth. The clamp member 310 is spaced from the clamping surface 306 of the base 304 and pivotable about an axis 312 in a clockwise direction indicated generally by the arrow labeled 314 and a counterclockwise direction indicated generally by the arrow labeled 316.

Each clamp member 310 includes a cam portion 320 and an actuator portion 322. The cam portion 320 defines a clamping surface 324 of the clamp member 310. The clamping surface 324 includes a plurality of teeth. The clamping surface 324 of the clamp member 310 is presented towards the clamping surface 306 of the base 304. The clamping surfaces 306 and 324 define between them a belt webbing passage 326 through which the belt webbing of the lap belt 60a is movable to pay out and retract the lap belt. The first portion 74a of the lap belt 60a is extensible through the belt webbing passage 326 of the first web grabber 300. The second portion 85a of the lap belt 60a is extensible through the belt webbing passage 326 of the second web grabber 302.

Each clamp member 310 includes biasing means (not shown), such as a spring, that biases the clamp member to rotate in the clockwise direction 314 to an unactuated condition of FIG. 6. In the unactuated condition, the clamping surfaces 306 and 324 of the base 304 and the clamp member 310, respectively, are spaced apart from each other a predetermined distance sufficient to form a clearance in the belt webbing passage 326 between the clamping surfaces and the webbing of the lap belt 60a. Thus, in the unactuated condition, the first and second portions 74a and 85a of the lap belt 60a are released by the web grabbers 300 and 302, respectively, and may be paid out from and retracted into the retractor 76a.

The retractor 76a includes first and second actuator arms 330 and 332 for actuating the first and second web grabbers 300 and 302, respectively. Each actuator arm 330 and 332 includes a first end portion 334 connected to the actuator plate 158a of the retractor assembly 156a and pivotal about an axis 336. The actuator arms 330 and 332 include a second end portion 340 opposite the first end portion 334 that is maintained in abutting engagement with the respective actuator portions 322 of the clamp members 310 of the first and second web grabbers 300 and 302.

Upon the occurrence of an event for which it is desirable for the retractor 76a to block payout of the lap belt 60a, the locking mechanism 170a is actuated (i.e., the pawl 174a is actuated to engage the teeth 176a). This, in turn, actuates the retractor from the unlocked condition of FIG. 6 to the locked condition of FIG. 7. When the pawl 174a moves into engagement with the teeth 176a of the ratchet 172a (as indicated by the pawl illustrated in dot-dashed lined in FIG. 6), rotation of the spool 96a in the counterclockwise (payout) direction 164a is blocked. Tension on the first and second portions 74a and 85a of the lap belt 60a, indicated generally by the arrows labeled 240a, is thus imparted to the actuator plate 158a of the retractor assembly 156a. This tension causes the actuator plate 158a to pivot about the axis 160a in the counter-clockwise direction 164a from the unactuated (unlocked) condition of FIG. 6 to the actuated (locked) condition of FIG. 7.

As the actuator plate 158a pivots to the actuated condition, the actuator arms 330 and 332 impart a force to the actuator portion 322 of the respective clamp members 310 of the first and second web grabbers 300 and 302. This force urges the clamp members 310 to pivot in the counterclockwise direction 316 about their respective axes 312. This causes the clamping surface 324 of the clamp member 310 to move toward the clamping surface 306 of the base 304 of the respective first and second web grabbers 300 and 302. The web grabbers 300 and 302 thus clamp down on the webbing of the lap belt 60a positioned in their respective belt webbing passages 326. The clamping surfaces 306 and 324 thus "grab" the webbing of the lap belt 60a and help prevent payout of the lap belt from the retractor 76a. The teeth, if included on the clamping surfaces 306 and 324, may help increase the grabbing effect of the web grabbers 300 and 302. The first web grabber 300 helps prevent payout of the first portion 74a of the lap belt 60a. The second web grabber 302 helps prevent payout of the second portion 85a of the lap belt 60a.

Once the clamping surfaces 306 and 324 grab the first and second portions 74a and 85a of the lap belt 60a, increased tension on the portions urges the clamp members 310 to rotate further in the counterclockwise direction 316. This increases the force by which the clamping surfaces 324 and 326 are urged together onto the first and second portions. The web grabbers 300 and 302 may thus bear a large portion of the force placed on the retractor 76a by the tensioned first and second portions 74a and 85a of the lap belt 60a when the retractor is in the actuated condition of FIG. 7.

Figure 8:
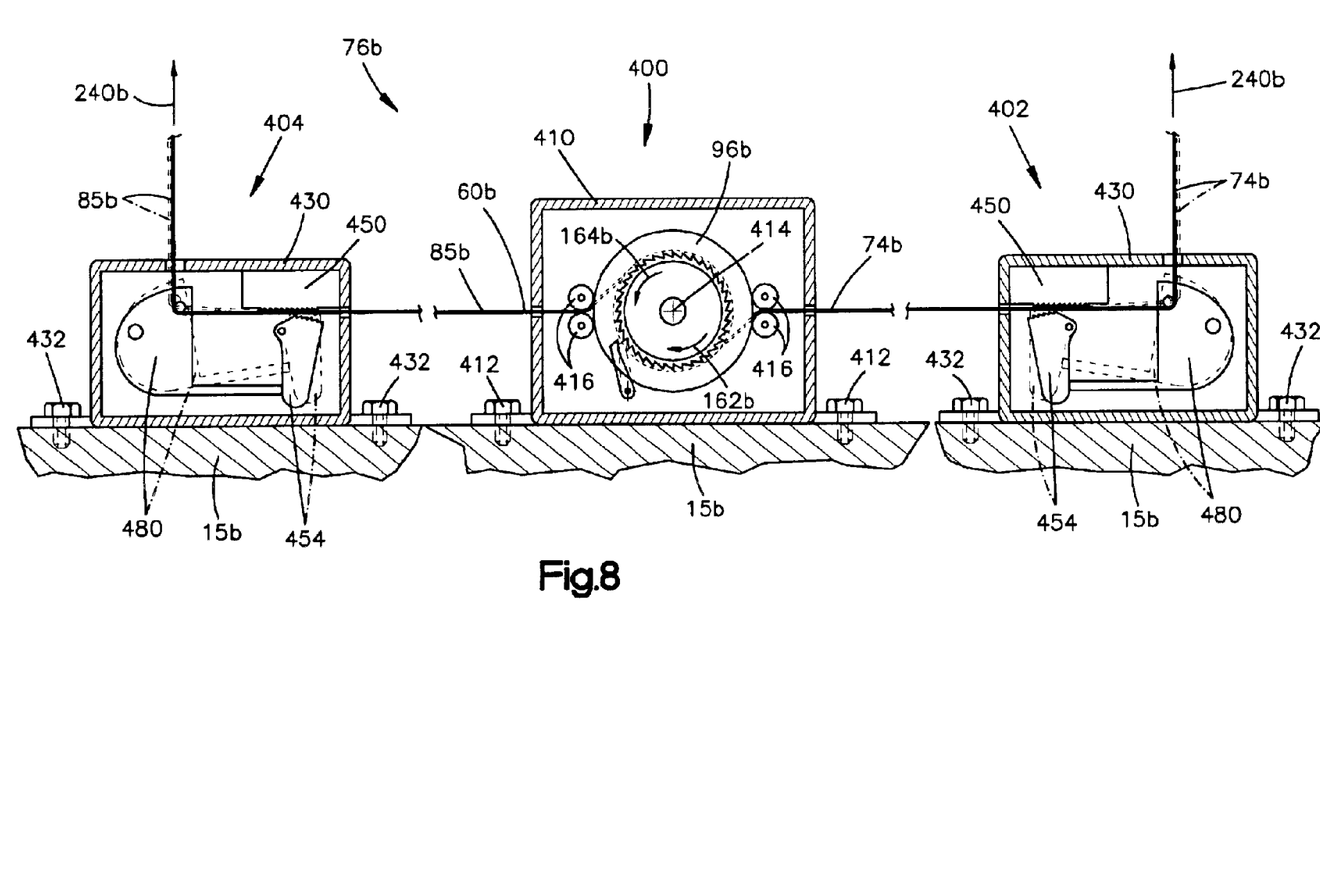
FIG. 8 is a schematic view, partially in section, of a portion of the seat belt system of FIGS. 1 and 2, according to a third embodiment of the present invention.
Figure 9:
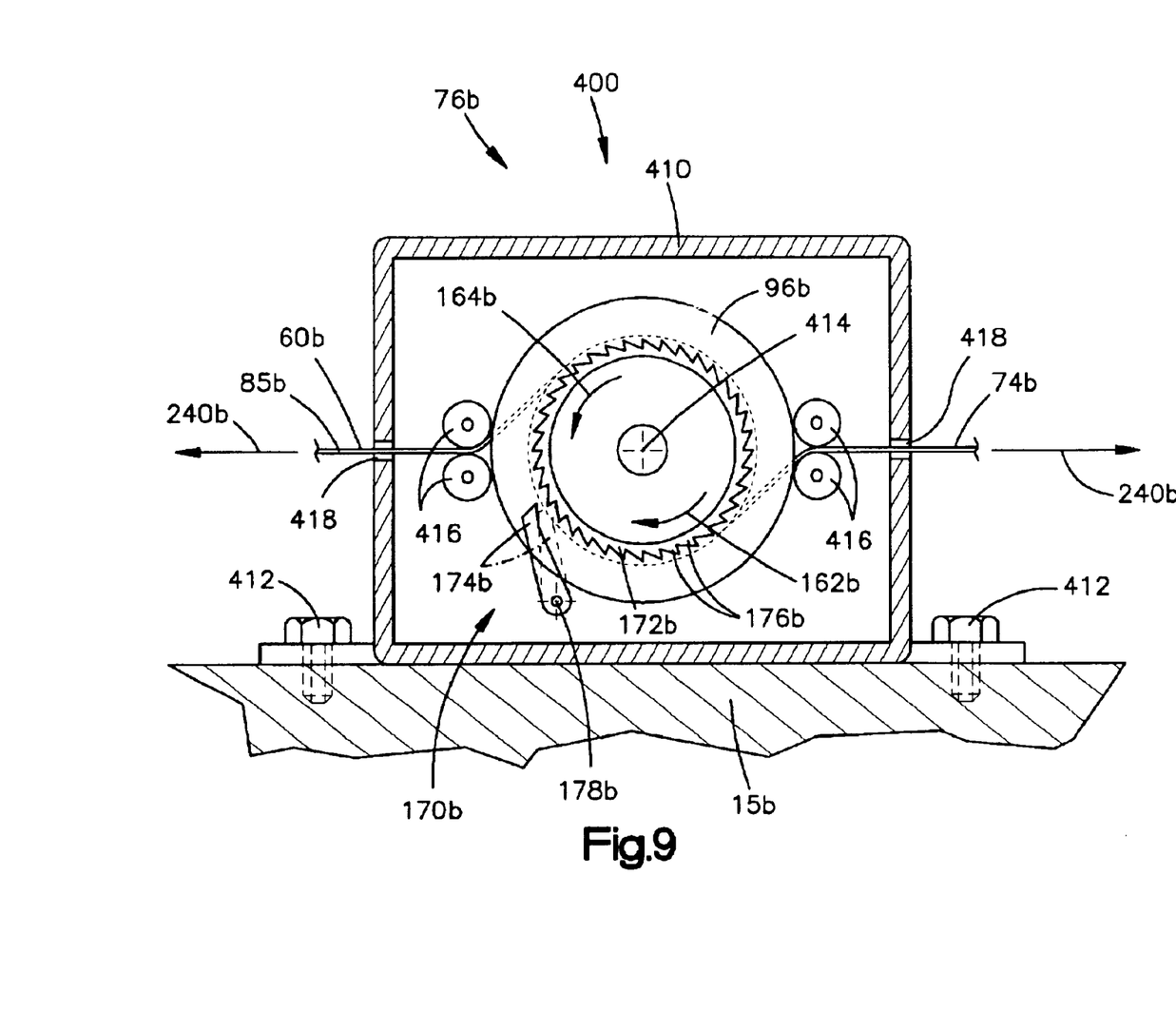
FIGS. 9 and 10 are enlarged schematic views, partially in section, of portions the seat belt system of FIG. 8.
Figure 10:
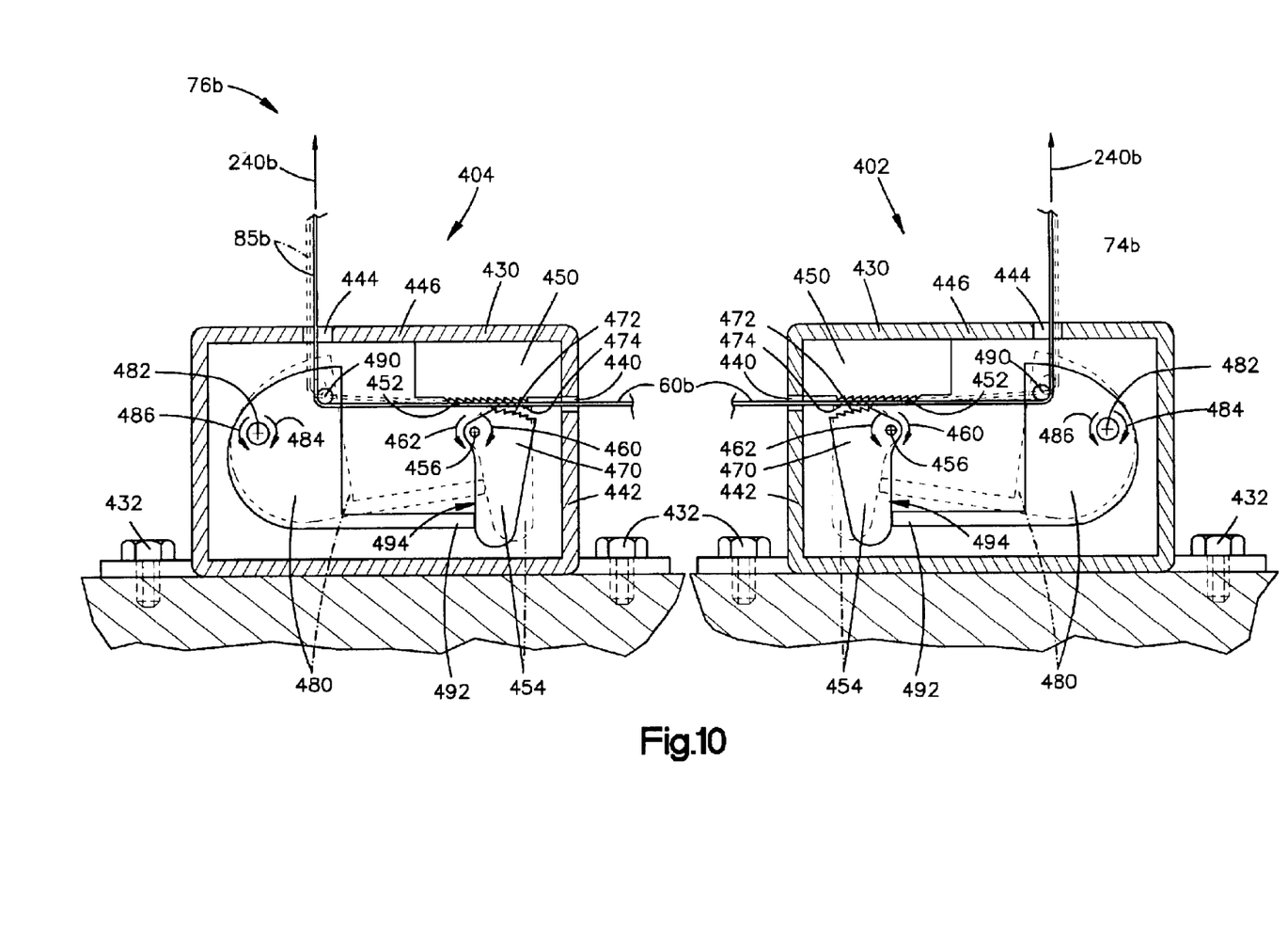

A third embodiment of the present invention is illustrated in FIGS. 8–10. The third embodiment of the invention is similar to the second embodiment of the invention illustrated in FIGS. 6 and 7. Accordingly, numerals similar to those of FIGS. 6 and 7 will be used in FIGS. 8–10 to identify similar components, the suffix letter "b" being associated with the numerals of FIGS. 8–10 to avoid confusion.

As illustrated in FIG. 8, the dual payout retractor 76b includes a retractor assembly 400 and first and second web grabbers 402 and 404. The retractor assembly 400 and the first and second web grabbers 402 and 404 are separate components mounted individually to the seat frame 15b.

Referring to FIGS. 8 and 9, the retractor assembly 400 has a housing 410 that is mounted to the seat frame 15b via means 412, such as fasteners. The retractor assembly 400 has a construction similar to the retractor assemblies of the first and second embodiments. The retractor assembly 400 of the third embodiment does not include an actuator plate that pivots relative to the housing 410. In the third embodiment, the spool 96b is supported by the housing 410 and is rotatable about an axis 414 in the housing. The spool 96b is rotatable in the clockwise direction 162b to retract (wind) the first and second portions 74b and 85b of the lap belt 60b. The spool 96b is rotatable in the counterclockwise direction 164b to pay out (unwind) the first and second portions 74b and 85b of the lap belt 60b. The spool 96b is biased in a known manner by a spring or other suitable biasing means (not shown) to rotate in the clockwise direction 162b to retract the lap belt 60b.

The retractor assembly 400 may also include guides 416 (FIG. 9), such as rollers or pins, for guiding the first and second portions 74b and 85b of the lap belt 60b in the housing 410. As shown in FIGS. 8 and 9, the guides 416 may help direct the first and second portions 74b and 85b through apertures 418 in opposite sides of the housing 410.

The retractor assembly 400 also includes a locking mechanism 170b comprising a ratchet 172b, connected to the spool 96b and rotatable with the spool about the axis 414, and a pawl 174b, connected to the housing 410. The pawl 174b is pivotal about an axis 178b to engage teeth 176b of the ratchet 172b to block rotational movement of the ratchet and thus the spool 96b. The locking mechanism 170b blocks rotation of the spool 96b to help prevent payout (unwinding) of the first and second portions 74b and 85b of the lap belt 60b. The locking mechanism 170b is actuatable by any suitable means to lock the spool 96b in response to a deceleration of the vehicle above a predetermined value and/or in response to unwinding acceleration of the lap belt portions 74b and 85b above a predetermined value.

Referring to FIGS. 8 and 10, each of the first and second web grabbers 402 and 404 has a housing 430 fixedly connected to the seat frame 15b via means 432, such as fasteners. The first and second web grabbers 402 and 404, as well as the retractor assembly 400, could be fixedly connected at an alternative location, such as to the vehicle floor. The first and second web grabbers 402 and 404 of the third embodiment may serve as guides (see items 82 and 88 of FIGS. 1 and 2) for helping to direct the first and second portions 74b and 85b of the lap belt 60b around the vehicle seat. The first and second portions 74b and 85b enter the respective housings 430 through an aperture 440 (FIG. 10) in a side wall 442 of the housing and are directed through an aperture 444 in a top wall 446 of the housing.

The first and second web grabbers 402 and 404 (FIG. 8) are actuatable to help block the first and second portions 74b and 85b of the lap belt 60b from being unwound and paid out from the retractor assembly 400 under tension. The first and second web grabbers 402 and 404 comprise rotary clamps similar to the web grabbers 300 and 302 (FIGS. 6 and 7) of the second embodiment. Each of the web grabbers 402 and 404 (FIGS. 8 and 10) includes a base member 450, a clamp member 454, and an actuator 480 supported in the housing 430.

Each base member 450 (FIG. 10) includes a clamping surface 452 that may include a plurality of teeth. The clamp members 454 are spaced from the clamping surface 452 of their respective base members 450. The clamp members 454 are pivotable about an axis 456 in a clockwise direction indicated generally by the arrow labeled 460 and in a counterclockwise direction indicated generally by the arrow labeled 462. Each clamp member 454 includes a portion 470 that defines a clamping surface 472 of the clamp member 454. The clamping surface 472 may also include a plurality of teeth.

The clamping surface 472 of the clamp member 454 is presented towards the clamping surface 452 of the base member 450 in each of the web grabbers 402 and 404. The clamping surfaces 452 and 472 define between them a belt webbing passage 474 through which the belt webbing of the lap belt 60b is movable when paid out from and retracted into the retractor assembly 400. The first portion 74b of the lap belt 60b is extensible through the belt webbing passage 474 of the first web grabber 402. The second portion 85b of the lap belt 60b is extensible through the belt webbing passage 474 of the second web grabber 404.

Each clamp member 454 includes a biasing means (not shown), such as a spring, that biases the clamp members to pivot relative to their respective housing 446 to an unactuated condition. The unactuated condition of the clamp members 454 is indicated by the clamp members illustrated in solid lines in of FIG. 10. The clamp member 454 of the first web grabber 402 is biased in the counterclockwise direction 462 to the unactuated condition. The clamp member 454 of the second web grabber 404 is biased in the clockwise direction 460 to the unactuated condition.

In the unactuated condition, the clamping surfaces 452 and 472 are spaced apart from each other a predetermined distance sufficient to form a clearance in the belt webbing passage 474 between the clamping surfaces and the webbing of the lap belt 60b. Thus, in the unactuated condition, the first and second portions 74b and 85b of the lap belt 60b are released by the web grabbers 402 and 404, respectively, to permit payout of the lap belt from the retractor assembly 400.

The actuators 480 are operative to actuate the clamp members 454 of the first and second web grabbers 402 and 404. Each actuator 480 is pivotable about an axis 482 in a clockwise direction indicated generally by the arrow labeled 484 and a counterclockwise direction indicated generally by the arrow labeled 486. Each of the web grabbers 402 and 404 includes means (not shown), such as a spring, for biasing the actuator 480 to an unactuated position. The unactuated condition of the actuators 480 is indicated by the actuators illustrated in solid lines in of FIG. 10. The actuator 480 of the first web grabber 402 is biased in the counterclockwise direction 486 to the unactuated condition. The actuator 480 of the second web grabber 404 is biased in the clockwise direction 484 to the unactuated condition.

Each actuator 480 includes a guide 490, such as a pin or a roller, around which the webbing of the lap belt 60b extends. The guide 490 helps direct the webbing of the lap belt 60b through the aperture 444 in the top wall 446 of the housing 430. The guide 490 is offset laterally from the axis 482 such that tension on the webbing of the lap belt 60b, indicated generally by the arrows labeled 240b, urges the actuator 480 to pivot about the axis 482 against the spring bias acting on the actuator. Tension on the first portion 74b of the lap belt 60b urges the actuator 480 of the first web grabber 402 to pivot in the clockwise direction 484. Tension on the second portion 85b urges the actuator 480 of the second web grabber 404 to pivot in the counterclockwise direction 486.

Each actuator 480 also includes a portion 492 for engaging an actuator surface 494 of the clamp member 454. The portion 492 is maintained in abutting engagement with the actuator surface 494 by the spring biases acting on the clamp member 454 and the actuator 480.

Upon the occurrence of an event for which it is desirable to block payout of the lap belt 60b (FIGS. 8–10) from the retractor 76b, the locking mechanism 170b is actuated (i.e., the pawl 174b (FIG. 9) is actuated to engage the teeth 176b). This, in turn, actuates the retractor from the unactuated (unlocked) condition to the actuated (locked) condition. The unactuated condition of the retractor 76b is indicated by the components (lap belt 60b, pawl 174b, clamp members 454, actuators 480) illustrated in solid lines in FIGS. 8–10. The actuated condition of the retractor 76b is indicated by the components illustrated in dot-dashed lines in FIGS. 8–10. When the pawl 174b moves into engagement with the teeth 176b of the ratchet 172b (as indicated by the pawl illustrated in dot-dashed lines in FIG. 9), rotation of the spool 96b in the counterclockwise (payout) direction 164b is blocked.

Referring to FIGS. 8–10, when the locking mechanism 170b blocks rotation of the spool 96b, tension on the first and second portions 74b and 85b of the lap belt 60b, indicated generally by the arrows labeled 240b, is imparted on the actuators 480 (FIG. 10) of the first and second web grabbers 402 and 404 via the guides 490. This tension causes the actuators 480 to pivot about their respective axes 482 from the unactuated (unlocked) condition to the actuated (locked) condition. Tension on the first portion 74b urges the actuator 480 of the first web grabber 402 to pivot in the clockwise direction 484. Tension on the second portion 85b urges the actuator 480 of the second web grabber 404 to pivot in the counterclockwise direction 486.

As the actuators 480 pivot to the actuated condition, the portions 492 impart a force on the actuator surfaces 494 of the respective clamp members 454 of the first and second web grabbers 402 and 404. This force urges the clamp members 454 to pivot about their respective axes 456. The clamp member 454 of the first web grabber 402 pivots in the clockwise direction 460. The clamp member 454 of the second web grabber 404 pivots in the counterclockwise direction 462.

As the clamp members 454 pivot toward the actuated condition of FIG. 10, the clamping surfaces 472 of the clamp members 454 move toward the respective clamping surfaces 452 of the base members 450 of the first and second web grabbers 402 and 404. The web grabbers 402 and 404 thus clamp down on the webbing of the lap belt 60b positioned in their respective belt webbing passages 474. The clamping surfaces 452 and 472 "grab" the webbing of the lap belt 60b and help prevent payout of the lap belt from the retractor 76b. The teeth, if included on the clamping surfaces 452 and 472, may help increase the grabbing effect of the clamping members 402 and 404. The first web grabber 402 helps prevent payout of the first portion 74b of the lap belt 60b. The second web grabber 404 helps prevent payout of the second portion 85b of the lap belt 60b.

Once the clamping surfaces 452 and 472 grab the first and second portions 74b and 85b of the lap belt 60b, increased tension on the portions urges the clamp members 454 to pivot further. This increases the force by which the clamping surfaces 452 and 472 are urged together onto the first and second portions 74b and 85b. The web grabbers 402 and 404 may thus bear a large portion of the force from the tension on the first and second portions 74a and 85a of the lap belt 60a when the retractor 76b is in the actuated condition.

From the above description of the invention, those skilled in the art will perceive improvements, changes and modifications. For example, the seat belt system could include pretensioners (not shown) and/or energy management devices (not shown). Also, while the drawings illustrate the seat belt system 10 mounted on a vehicle seat and integrated with the seat, certain parts of the seat belt system or even the entire seat belt system could be mounted to alternative parts of the vehicle, such as the vehicle body. Moreover, although the embodiments illustrate a four point seat belt system, the present invention could be implemented in any seat belt system incorporating a dual payout retractor, such as a five point system, a six point system, or a two point system (i.e., lap belt only). Furthermore, in the embodiments, the retractor assembly and the web grabbers have been illustrated schematically and thus may have a variety of alternative configurations in keeping with the functional description of the present invention disclosed herein. Such improvements, changes and modifications within the skill of the art are intended to be covered by the appended claims.

What is claimed is:

1. A seat belt system for helping to restrain an occupant of a vehicle seat, said seat belt system comprising:

a lap belt comprising first and second portions extensible adjacent opposite sides of the vehicle seat and across a seating portion of the vehicle seat;

a buckle assembly for releasably connecting said first and second portions of said lap belt while extended across the vehicle seat; and a retractor comprising:

a spool rotatable about an axis, said first and second portions of said lap belt being secured to said spool, said spool being biased to rotate in a first rotational direction to wind said first and second portions onto said spool, said first and second portions when tensioned urging said spool to rotate in a second rotational direction opposite said first rotational direction to unwind said first and second portions from said spool;

a locking mechanism actuateble to a locked condition to lock said spool against rotation in said second rotational direction, said locking mechanism resisting oppositely directed forces applied to said spool and said locking mechanism by said first and second portions of said lap belt to resist rotation of said spool in the second rotational direction for unwinding the first and second portions of the lap belt;

a first web grabbing device actuatable to clamp onto said first portion of said lap belt when said locking mechanism is in said locked condition to resist movement of said first portion of said lap belt in a first direction relative to the retractor and to reduce the force applied to said spool and said locking mechanism by said first portion of said lap belt that tends to rotate the spool in the second rotational direction; and a second web grabbing device actuatable to clamp onto said second portion of lap belt when said locking mechanism is in said locked condition to resist movement of said second portion of said lap belt in a second direction relative to the retractor and to reduce the force applied to said spool and said locking mechanism by said second portion of said lap belt that tends to rotate the spool in the second rotational direction.

2. A seat belt system as recited in claim 1, wherein said first web grabbing device comprises a first actuator actuatable as a result of tension on said lap belt when said locking mechanism is in said locked condition, said first actuator when actuated urging opposing clamping surfaces of said first web grabbing device to clamp onto said first portion of said lap belt, and said second web grabbing device comprises a second actuator actuatable as a result of tension on said lap belt when said locking mechanism is in said locked condition, said second actuator when actuated urging opposing clamping surfaces of said second web grabbing device to clamp onto said second portion of said lap belt.

3. A seat belt system as recited in claim 2, further comprising a plate portion for supporting said spool and said first and second actuators, said spool being rotatable relative to said plate portion, said locking mechanism when in said locked condition blocking rotation of said spool relative to said plate portion in said second rotational direction, said plate portion pivoting as a result of tension on said lap belt while said locking mechanism is in said locked condition, said first and second actuators being actuated when said plate portion pivots.

4. The seat belt system recited in claim 2, wherein said opposing clamping surfaces of said first web qrabbing device when engaging said first portion of said lap belt are urged together as a result of tension on said first portion of said lap belt, and said opposing clamping surfaces of said second web grabbing device when engaging said second portion of said lap belt are urged together as a result of tension on said second portion of said lap belt.

5. A seat belt system as recited in claim 1, wherein said first and second web grabbing devices each comprise a wedge clamp, each of said wedge clamps comprising:

a housing having a planar first sliding surface presented at an angle towards a planar second sliding surface;

first and second clamp, members supported between the sliding surfaces, said first clamp member being slidable along said first sliding surface, said second clamp member being slidable along said second sliding surface, said first and second clamp members having respective clamping surfaces presented toward each other, said lap belt extending between said clamping surfaces, said first and second clamp members being actuatable to slide simultaneously along said first and second sliding surfaces, said clamping surfaces of said first and second clamp members moving toward each other and clamping onto said lap belt upon actuation of said clamp members.

6. A seat belt system as recited in claim 5, further comprising a first actuator arm for actuating said first and second clamp members of said first web grabbing device, and a second actuator arm for actuating said first and second clamp members of said second web grabbing device, said first and second actuator arms being actuatable as a result of tension on said lap belt when said locking mechanism is in said locked condition.

7. A seat belt system as recited in claim 6, further comprising a plate portion for supporting said spool and said first and second actuator arms, said spool being rotatable relative to said plate portion, said locking mechanism when in said locked condition blocking rotation of said spool relative to said plate portion in said second rotational direction, said plate portion pivoting as a result of tension on said lap belt while said locking mechanism is in said locked condition, said first and second actuator arms being actuated when said plate portion pivots.

8. A seat belt system as recited in claim 1 wherein said first and second web grabbing devices each comprise a rotary clamp, each of said rotary clamps comprising:

a base portion having a first clamping surface; and a clamp member spaced from said base portion and having a second clamping surface presented toward said first clamping surface, said clamp member being pivotable in opposite first and second rotational directions, said lap belt extending between said first and second clamping surfaces, said clamp member being actuatable to pivot in said first rotational direction to move said second clamping surface toward said first clamping surface, said first and second clamping surfaces clamping onto said lap belt upon actuation of said clamp member.

9. A seat belt system as recited in claim 8, further comprising a first actuator arm for engaging an actuator portion of said clamp member of said first web grabbing device to actuate said first web grabbing device, and a second actuator arm for engaging an actuator portion of said clamp member of said second web grabbing device to actuate said second web grabbing device, said first and second actuator arms being actuatable as a result of tension on said lap belt when said locking mechanisms is in said locked condition.

10. A seat belt system as recited in claim 9, further comprising a plate portion for supporting said spool and said first and second actuator arms, said spool being rotatable relative to said plate portion, said locking mechanism when in said locked condition blocking rotation of said spool relative to said plate portion in said second rotational direction, said plate portion pivoting as a result of tension on said lap belt while said locking mechanism is in said locked condition, said first and second actuator arms being actuated when said plate portion pivots.

11. The seat belt system recited in claim 8, further comprising a first guide for guiding said first portion of said lap belt adjacent a first side of the vehicle seat, and a second guide for guiding said second portion of said lap belt adjacent a second side of the vehicle seat, said first guide being adapted to pivot as a result of tension on said first portion of said lap belt when said locking mechanism is in said locked condition, said first guide including a first actuator arm for engaging an actuator portion of said clamp member of said first web grabbing device to actuate said first web grabbing device when said first guide pivots, said second guide being adapted to pivot as a result of tension on said second portion of said lap belt when said locking mechanism is in said locked condition, said second guide including a second actuator arm for engaging an actuator portion of said clamp member of said second web grabbing device to actuate said second web grabbing device when said second guide pivots.

12. The seat belt system of claim 1 wherein each of said first and second web grabbing devices includes a base portion having a first clamping surface and a clamp member having a second clamping surface, said clamp member being actuatable between a clamped condition and an unclamped condition, an actuation member being associated with said clamp member for actuating said clamp member into the clamped condition, a portion of said actuation member engaging a surface of said clamp member and moving over said surface of said clamp member to actuate said clamp member into the clamped condition.

13. The seat belt system of claim 1 wherein each of said first and second web grabbing devices has an associated housing and includes a base portion having a first clamping surface and a clamp member having a second clamping surface, said clamp member being actuatable between a clamped condition and an unclamped condition, an actuation member being associated with the clamp member for actuating said clamp member into the clamped condition, a first pivot member pivotally attaching said clamp member to said associated housing and a second, different pivot member pivotally attaching said actuation member to said associated housing.

14. A seat belt system comprising:
  a dual payout retractor including a spool rotatable about an axis;
  a length of seat belt webbing having a central portion secured to said spool and first and second portions extending from said retractor, said retractor being operable to wind said first said second portions onto said spool to retract said first and second portions, said retractor being operable to unwind said first and second portions from said spool to payout said first and second portions;
  a locking mechanism actuatable to a locked condition to lock said spool against unwinding said first and second portions, said locking mechanism resisting oppositely directed forces applied to said spool and said locking mechanism by said first and second portions of said lap belt to resist rotation of said spool in a direction for unwinding said first and second portions of said length of seat belt webbing;
  a first web grabbing device actuatable under tension of said first portion to clamp onto said first portion when said locking mechanism is in said locked condition to resist movement of said first portion in a first direction relative to the retractor and to reduce the force applied to said spool and said locking mechanism by said first portion of said length of seat belt webbing; and
  a second web grabbing device actuatable under tension of said second portion to clamp onto said second portion when said locking mechanism is in said locked condition to resist movement of said second portion in a second direction relative to the retractor and to reduce the force applied to said spool and said locking mechanism by said second portion of said length of seat belt webbing.

15. A seat belt system for helping to restrain an occupant of a vehicle seat, said seat belt system comprising:
  seat belt webbing;
  a retractor having a rotatable spool and a locking mechanism, an end of said seat belt webbing being attached to said spool end a portion of said seat belt webbing adjacent said end being wound about said spool, said spool being biased to rotate in a first rotational direction to wind said seat belt webbing onto said spool, tension in said seat belt webbing urging said spool to rotate in a second rotational direction opposite said first rotational direction to unwind said seat belt webbing from said spool, said locking mechanism being actuatable to a locked condition to lock said spool against rotation in said second rotational direction; and
  a web grabbing device actuatable to clamp onto said seat belt webbing when said locking mechanism is in said locked condition, said web grabbing device including a base portion having a first clamping surface and a clamp member having a second clamping surface, said seat belt webbing passing between said first and second clamping surfaces, said clamp member being actuatable between a clamped condition in which said second clamping surface is moved toward said first clamping surface to clamp said seat belt webbing between said first and second clamping surfaces and an unclamped condition in which said seat belt webbing is free to pass between said first and second clamping surfaces,
  said web grabbing device further including an actuation member that is responsive to tension in said seat belt webbing for actuating said clamping member into the clamped condition, a portion of said actuation member engaging a surface of said clamp member and sliding relative to said surface of said clamp member to actuate said clamping member into the clamped condition.

16. The seat belt system of claim 15 wherein said seat belt webbing forms a lap belt portion of the seat belt system.

17. The seat belt system of claim 15 wherein said actuation member includes a guide for contacting said seat belt webbing, tension in said seat belt webbing acting upon said guide to cause said actuation member to rotate about an axis and actuate said clamping member, said axis being located farther away from said retractor than said guide.

18. The seat belt system of claim 15 wherein said web grabbing device includes a housing in which said clamping member and said actuation member are located, a first pivot member pivotally attaching said clamping member to said housing and a second, different pivot member pivotally attaching said actuation member to said housing.

19. A seat belt system for helping to restrain an occupant of a vehicle seat, said seat belt system comprising:

a lap belt portion having opposite first and second ends;

a retractor having a rotatable spool and a locking mechanism, said first end of said lap belt portion being attached to said spool and part of said lap belt portion adjacent said first end being wound about said spool, said spool being biased to rotate in a first rotational direction to wind said lap belt portion onto said spool, tension in said lap belt portion urging said spool to rotate in a second rotational direction opposite said first rotational direction to unwind said lap belt portion from said spool, said locking mechanism being actuatable to a locked condition to lock said spool against rotation in said second rotational direction;

a buckle assembly for securing said lap belt portion about the occupant of the vehicle seat, said second end of said lap belt portion being attached to said buckle assembly; and a web grabbing device actuatable into a clamped condition in which said lap belt portion is clamped onto and is prevented from moving relative to said web grabbing device, wherein said web grabbing device is actuatable into the clamped condition in response to said locking mechanism being actuated into the locked condition and tension arising in said lap belt portion, and wherein said web grabbing device including a base portion having a first clamping surface and a clamp member having a second clamping surface, said lap belt portion passing between said first and second clamping surfaces, said clamp member being actuatable between a clamped condition in which said second clamping surface is moved toward said first clamping surface to clamp said seat belt webbing between said first and second clamping surfaces and an unclamped condition in which said seat belt webbing is free to pass between said first and second clamping surfaces, said web grabbing device further including an actuation member that is responsive to tension in said seat belt webbing for actuating said clamping member into the clamped condition, a portion of said actuation member engaging a surface of said clamp member and sliding relative to said surface of said clamp member to actuate said clamping member into the clamped condition.

20. The seat belt system of claim 19 wherein said web grabbing device includes a housing in which said clamping member and said actuation member are located, a first pivot member pivotally attaching said clamping member to said housing and a second, different pivot member pivotally attaching said actuation member to said housing.

* * * * *

UNITED STATES PATENT AND TRADEMARK OFFICE
CERTIFICATE OF CORRECTION

PATENT NO. : 6,824,222 B2
DATED : November 30, 2004
INVENTOR(S) : Barry J. Maloney et al.

It is certified that error appears in the above-identified patent and that said Letters Patent is hereby corrected as shown below:

Column 13,
Line 31, after "mechanism" change "actuateble" to -- actuatable --.

Column 14,
Line 10, after "web" change "qrabbing" to -- grabbing --.

Column 16,
Line 30, after "spool" change "end" to -- and --.

Signed and Sealed this

Twenty-fourth Day of May, 2005

JON W. DUDAS
*Director of the United States Patent and Trademark Office*